(12) United States Patent
Lamm

(10) Patent No.: US 8,198,849 B2
(45) Date of Patent: Jun. 12, 2012

(54) METHOD AND DEVICE FOR PROTECTION AGAINST JAMMING IN A MOTOR-DRIVEN LOCKING SYSTEM

(75) Inventor: Hubert Lamm, Kappelrodeck (DE)

(73) Assignee: Robert Bosch GmbH, Stuttgart (DE)

( * ) Notice: Subject to any disclaimer, the term of this patent is extended or adjusted under 35 U.S.C. 154(b) by 547 days.

(21) Appl. No.: 12/373,821

(22) PCT Filed: Jun. 19, 2007

(86) PCT No.: PCT/EP2007/056094
§ 371 (c)(1),
(2), (4) Date: Oct. 13, 2009

(87) PCT Pub. No.: WO2008/009531
PCT Pub. Date: Jan. 24, 2008

(65) Prior Publication Data
US 2010/0019713 A1    Jan. 28, 2010

(30) Foreign Application Priority Data

Jul. 17, 2006 (DE) .......... 10 2006 033 022

(51) Int. Cl.
*H02P 7/00* (2006.01)
*E05F 15/02* (2006.01)
*E05F 15/20* (2006.01)

(52) U.S. Cl. ........ 318/476; 318/264; 318/280; 318/283; 318/286; 318/434; 318/443; 318/445; 318/466; 318/467; 318/469; 49/26; 49/29; 49/31

(58) Field of Classification Search ................... 318/264, 318/280, 283, 286, 434, 443, 445, 466, 467, 318/469, 476; 49/26, 29, 31
See application file for complete search history.

(56) References Cited

U.S. PATENT DOCUMENTS

| 5,530,329 A * | 6/1996 | Shigematsu et al. .......... 318/469 |
| 5,539,290 A | 7/1996 | Lu et al. |
| 6,034,495 A * | 3/2000 | Tamagawa et al. ........... 318/266 |
| 6,952,087 B2 * | 10/2005 | Lamm .......................... 318/283 |
| 2004/0257010 A1 | 12/2004 | Yamamoto |
| 2005/0088130 A1 * | 4/2005 | Ohshima ...................... 318/469 |
| 2006/0061314 A1 * | 3/2006 | Shinohara et al. ............ 318/466 |
| 2006/0220604 A1 * | 10/2006 | Hirai ............................ 318/286 |

FOREIGN PATENT DOCUMENTS

GB    2 267 161    11/1993

* cited by examiner

*Primary Examiner* — Walter Benson
*Assistant Examiner* — Gabriel Agared
(74) *Attorney, Agent, or Firm* — Merchant & Gould P.C

(57) ABSTRACT

The present invention relates to a method for protection against jamming in a motor-driven locking system and a device for the execution of the method.

6 Claims, 1 Drawing Sheet

METHOD AND DEVICE FOR PROTECTION AGAINST JAMMING IN A MOTOR-DRIVEN LOCKING SYSTEM

TECHNICAL FIELD

The present invention concerns a procedure and a device for protection against a jamming in a motor-driven locking system, as for example at motor-driven sun roofs or power windows of motor vehicles.

BACKGROUND

Different types of procedures for protection against jamming in a motor-driven locking system are known from the state of the art. In order to avoid a threat of persons or a damage of objects, such systems have to have a jamming protection. Therefore a jamming situation has to be noticed reliably.

To recognize a jamming situation usually a driving electromotor is controlled. If a specified jamming force reduces a motor engine speed of the drive, a jamming situation is detected and the drive direction of the motor is reversed. Thereby a reversion of the locking process is executed. Due to statutory provision the measurement of the jamming force takes place usually with spring rates of 10 N/mm, 20 N/mm and 65 N/mm. But in particular the hard spring rate of 65 N/mm has different requirements than the softer spring rates. Therefore two different algorithms are implemented usually in a memory, in order to detect a jamming situation at the sot and the hard spring rate.

But de facto it happens over and over that due to mechanic problems, particularly increased rubbing at transition points of the sun roof or the window, an engine speed course occurs at the drive, which corresponds a course of a jamming situation with the hard spring rate. Thereby the system is falsely reveres due to the mechanic problems, even though no jamming situation occurred. Even though modern locking systems provide an adaptation algorithm, in order to allow an automatic adaptation of stiffness during a locking process and to continue the locking process, the adaptation algorithm cannot react quickly enough at the hard spring rate. Thereby it is not possible to compensate the stiffness at this position with the present adaptation algorithm. Furthermore the familiar adaptation algorithms mostly save the necessary information only over several and support points along the entire of the locking system and detected over support points, so that certain inaccuracies occur.

SUMMARY

The procedure according to the invention for protection against jamming in a motor-driven locking system with the characteristics of claim 1 provides the advantage that it only undertakes one partial adaptation at problematic points during the locking process. In doing so in particular necessary memory requirements for saving engine values during a locking process can be reduced. Therefore a big memory for saving a continuing locking process from the beginning to the end has not to be presented anymore to adapt eventually once occurring problems. This is achieved according to the invention by detecting a first stiffness during the locking process at a motor-driven locking. Due to the stiffness the locking process is reversed, to ensure that no jamming occurs. The values for the position of the stiffness and the amplitude of an engine speed change of the drive are thereby saved. Furthermore a counter value of a counter is increased by 1. The counter value is thereby usually at zero during the first locking process. Subsequently another locking process is started. If at the next locking a second stiffness is detected, a comparison of the position of the first stiffness with the second stiffness is undertaken. If the positions of the first and the second stiffness are the same, a comparison of the counter value with a default value is undertaken. If the counter value is the same as the default value, the locking process is continued by a partial compensating of the stiffness point. The counter detects therefore the frequency of the occurrence at one position and activates after a default number of reversing the saved compensation value at this point. To exclude that the compensation value is not activated right at the first occurrence of stiffness, the default counter value has to be at least 1. Therefore the present invention ensures that a locking process can be continued when no jamming situation occurs, which cannot be carried out with the previous adaptation algorithms.

The sub-claims show preferred improvements of the invention.

Preferably the procedure is implemented at a stiffness with a high spring rate, in particular a spring rate of 65 N/mm. But it shall be noted that the procedure can also be provided at lower spring rates.

It is furthermore preferred to delete a saved position and an amplitude value of an engine speed change of the first stiffness, when no stiffness occurs at a subsequent locking process at the position of the first stiffness. Thereby it is ensured that the procedure does not occupy unnecessarily storage space. It shall be noted that it can also be provided that, when a closing process has been implemented without disturbances, all the saved values for the partial adaptation can be deleted. Thereby the necessary memory requirements can be significantly reduced and the upstream power surplus deleted again.

Alternatively also the position and the compensation value can stay in the memory and at a new locking process at an occurrence of a stiffness at the same position as the first stiffness, the compensation value can be released and the stiffness thus compensated.

In order to comply with different desires of different vehicle manufacturers, the procedure can be activated or deactivated preferably by an external signal. Therefore it is for example possible to leave the procedure generally deactivated and only activate it when a problem occurs, due to which the locking process cannot be carried out anymore. This can for example happen in an auto shop.

The procedure for protection against jamming at a locking system is implemented by a device, which comprises a motor, a detection unit, a control unit, a memory and a counter. The control unit carries out the saving of the compensation values at the occurrence of a stiffness, set the counter higher by 1 and compares the actual counter value of the counter with a default counter value. Furthermore the control unit activates the compensation value if necessary.

BRIEF DESCRIPTION OF THE DRAWINGS

Subsequently an embodiment of the present invention is described in detail by the associated drawing. In the drawing is.

DETAILED DESCRIPTION

Subsequently a preferred embodiment of the invention is described in detail with reference to the figures.

The procedure according to the invention for protection against jamming is further explained with the aid of a sun roof of a motor vehicle. But the procedure can also be used at power windows or other motor-driven locking systems.

Figure 1:
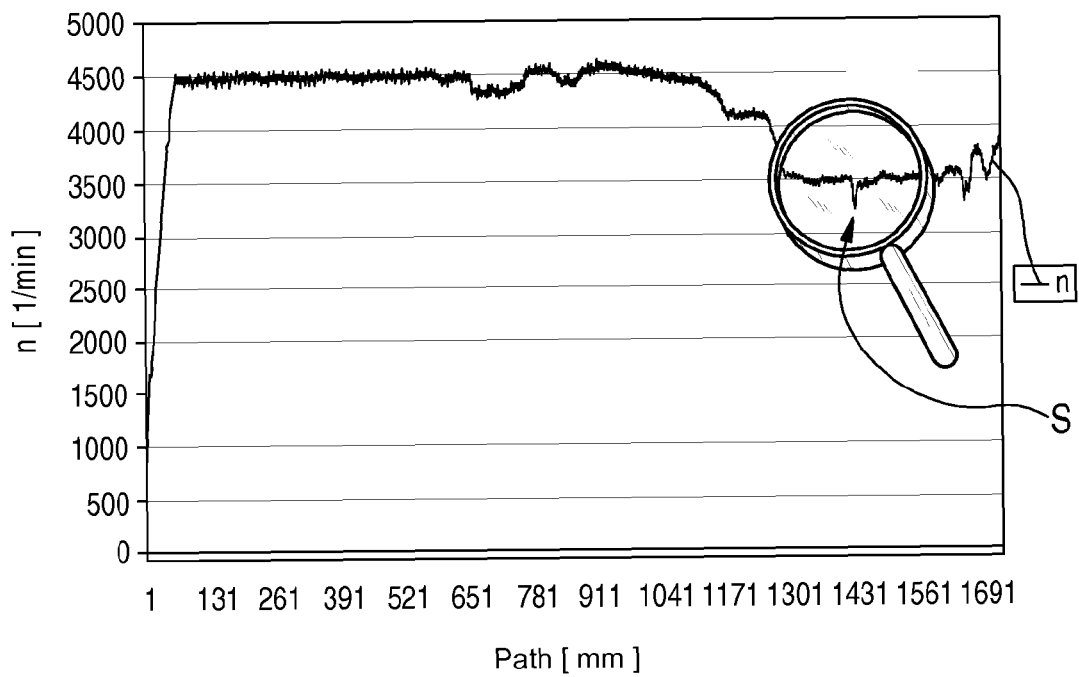
FIG. 1 is a diagram, which shows an engine speed of a drive for a sun roof over a distance.
Figure 2:
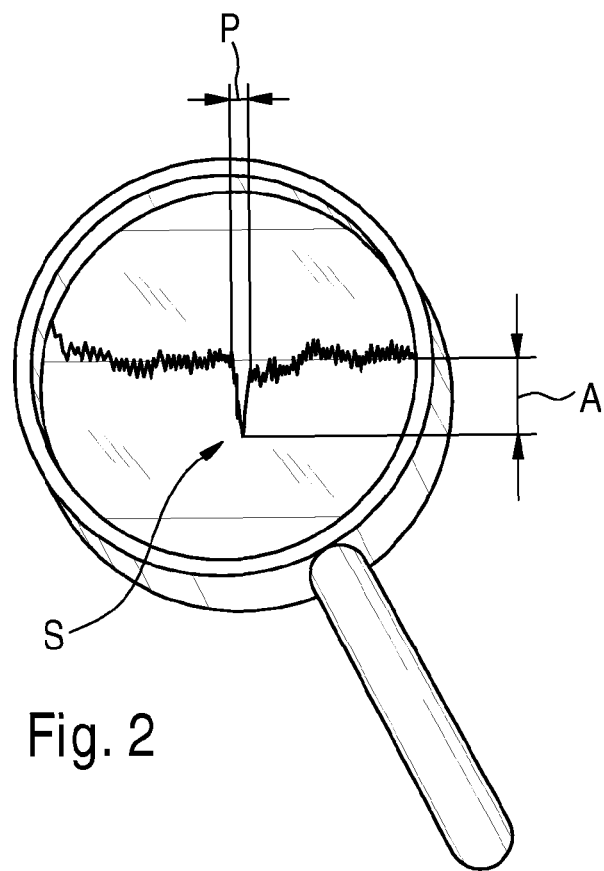
FIG. 2 is an increased partial view of the diagram of FIG. 1 with a position at which a stiffness occurs during the locking process.

FIG. 1 shows a course of an engine speed of an electromotor, which serves as a drive for the sun roof. FIG. 2 shows an increased extract of this engine speed course, whereby one position, at which the roof is reversed, is shown enlarged.

As it is apparent from FIG. 1, the engine speed of the drive goes up to ca. 4500 U/min after starting the locking process. Over a longer extent this engine speed stays basically constant, whereby it sinks down to a value of ca. 3500 U/min the closer the end of the locking process is. Thereby a stiffness position S occurs. The sun roof reverses and opens up again at this stiffness position S. even though there was no jamming situation at this stiffness position S, the sun roof is opened again, because theoretically it could have been a possible jamming situation due to the abrupt engine speed change of the drive. This eventual jamming situation is implemented with the familiar devices, as for examples an engine speed observation of the motor, an observation of a current demand of the motor etc. Simultaneously a counter value of a counter is increased by 1.

After the drive direction has been reversed the sun roof has been opened again, the locking process is carried out once more. If the detection device detects no other stiffness the sun roof is closed normally. But if the stiffness was based on a mechanical datum, in particular at transition points of the sun roof, a second stiffness will occur again at the same position during the second locking process. The system recognizes the second stiffness and a control unit compares the position of the first stiffness with the position of the second stiffness. In FIG. 2 the position of the stiffness is a range P, which is several millimeters wide. It shall be noted, that during the comparison certain tolerances can be considered at the beginning or at the end of the position range P. This means that, if for example the area lies between 1450 mm and 1460 mm, a tolerance of ±2 mm for the threshold value can be provided for the comparison, so that when the second stiffness occurs a comparison is positive, when the position range of the second stiffness lies for example between 1448 mm and 1462 mm.

If the position of the first and the second stiffness is the same, the control unit compares in a next step the counter value of the counter with a default value. Preferably the original counter value was zero and now the actual counter value is 1 due to increasing the counter value by 1. Thereby the default value is still preferably also 1, in order to avoid that a reversing of the sun roof at the stiffness position S is necessary two times or more often. Hereby it can be excluded with a certain probability that a jamming situation occurred, because this is relatively improbable for the same area.

If the actual counter value of the counter is the same as the default counter value, the stiffness position S can be balanced by a compensation value. The compensation value is determined by the amplitude A of the stiffness position S. a value of the amplitude A of this embodiment is ca. 200 U/min.

The stiffness position S that is shown in FIGS. 1 and 2 corresponds with a jamming situation for a spring rate of 65 N/mm². Due to the fast engine speed change the present adaptation algorithm for an automatic adaptation of stiffness cannot be activated. Also the amplitude A in the area of the stiffness is too small to be compensated by the normal adaptation algorithm. Therefore the procedure according to the invention steps in and carries out a partial adaptation of the stiffness position S. because only a few values, in particular position P, the amplitude A and a counter value have to be saved for the partial adaptation, the necessary memory requirements are very low.

The procedure according to the invention can be interpreted in such a way that it is possible to compensate only one position. Thereby especially the memory requirement is kept at a minimum. But if it would be desired that several positions can be compensated, a memory requirement for several stiffness positions has to be provided if necessary.

The invention claimed is:

1. A method of protecting against jamming in a motor-driven locking system, the method comprising:
   implementing a first locking process;
   detecting a first stiffness during the first locking process;
   reversing a drive direction;
   saving a position value of a position of the first stiffness;
   saving an amplitude value of the first stiffness;
   increasing a counter value of a counter;
   implementing a second locking process;
   upon detecting a second stiffness, detecting a position value and an amplitude value of the second stiffness;
   comparing the position value of the first and the second stiffness, and upon an evaluation in that the comparison results in a same position, comparing an actual counter value with a default counter value; and
   upon determining that the actual counter value is the same as the default value, compensating for the stiffness at the position by a partial compensation with a compensation value based on an amplitude value of the stiffness.

2. A method according to claim 1, further comprising compensating for a stiffness of a spring rate of approximately 65 N/mm².

3. A method according to claim 1, further comprising, upon lacking detection of a stiffness at the position of the first stiffness in subsequent locking processes, deleting the saved value of the position and the amplitude of the first stiffness.

4. A method according to claim 1, further comprising instantly compensating for a stiffness with the compensation value upon detection of stiffness occurring at the position of the first stiffness at a subsequent locking process.

5. A method according to claim 1, further comprising activating or deactivating the method of protecting against jamming in a motor-driven locking system by an external signal.

6. A device for implementing a method of protecting against jamming in a motor-driven locking system, the method comprising: implementing a first locking process; detecting a first stiffness during the first locking process; reversing a drive direction; saving a position value of a position of the first stiffness; saving an amplitude value of the first stiffness; increasing a counter value of a counter; implementing a second locking process; upon detecting a second stiffness, detecting a position value and an amplitude value of the second stiffness; comparing the position value of the first and the second stiffness, and when the comparison results in a same position, comparing an actual counter value with a default counter value; and upon determining that the actual counter value is the same as the default value, compensating for the stiffness at the position by a partial compensation with a compensation value based on an amplitude value of the stiffness, the device comprising: a motor; a detection unit for detecting a jamming situation; a control unit; and a counter.

* * * * *